INVENTORS
JOHN F. CIRINO
CHARLES BRENNER
BY Seidel & Gonda
ATTORNEYS.

Nov. 1, 1966  J. F. CIRINO ET AL  3,281,877
WASHER FOR AN AUTOMOBILE WHEEL
Filed April 7, 1965  2 Sheets-Sheet 2
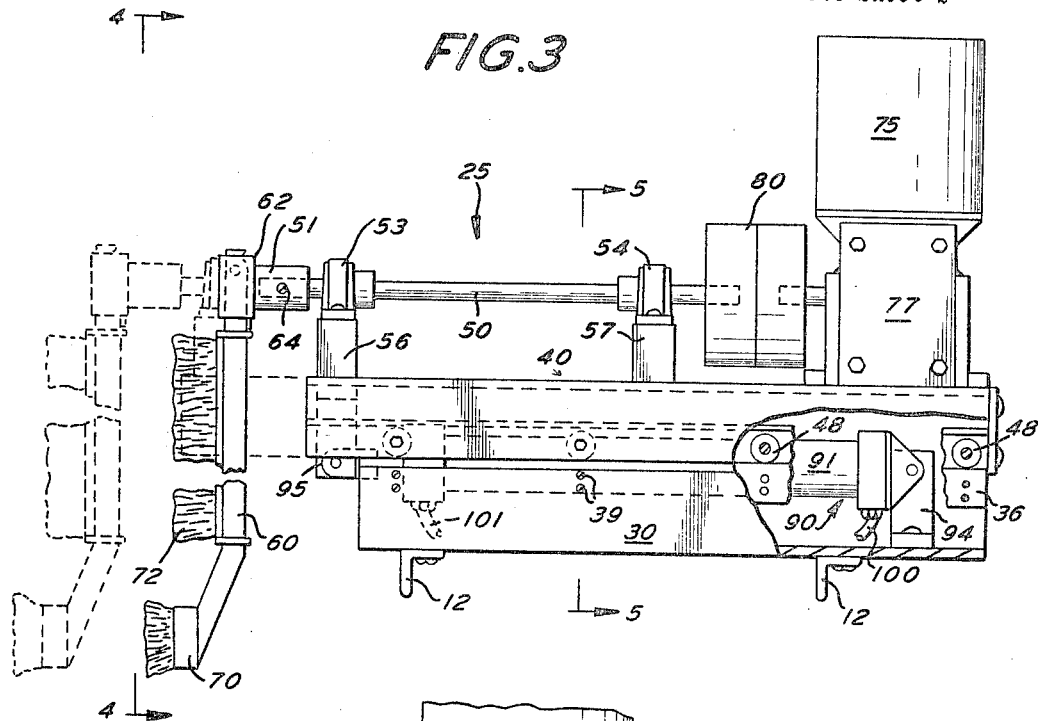
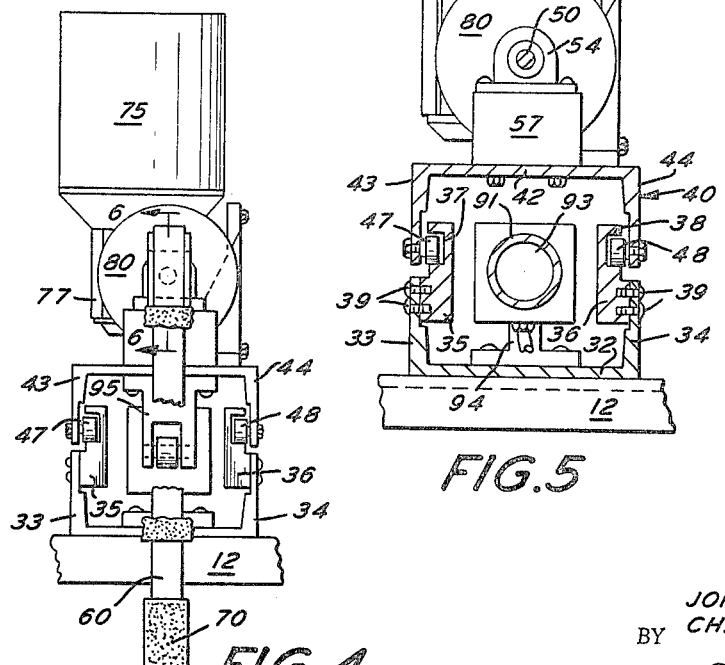
INVENTORS
JOHN F. CIRINO
CHARLES BRENNER
BY
Seidel & Gonda
ATTORNEYS.

United States Patent Office 3,281,877
Patented Nov. 1, 1966

---

3,281,877
WASHER FOR AN AUTOMOBILE WHEEL
John F. Cirino, Churchville, Pa., and Charles Brenner, Overbrook Hills, Pa., assignors to Universal Robot Inc., Bala Cynwyd, Pa., a corporation of Pennsylvania
Filed Apr. 7, 1965, Ser. No. 446,191
15 Claims. (Cl. 15—21)

This invention relates generally to an apparatus for washing and drying a stationary automobile and in particular to an automatic wheel washing component thereon.

Most car washing apparatuses on the market today are designed for manual or semi-automatic operation. These devices require human supervision and performance of some of the operations of the washing and drying cycles.

It is the main object of this invention to disclose a car washing apparatus adapted to have a completely automatic operation which may be initiated by insertion of a coin.

Another object of this invention is to provide a wheel washer on a car washing apparatus which reciprocates relative to a stationary automobile for washing and drying the automobile without manual intervention.

An object of this invention is to provide a wheel washer which may be programmed into the washing, rinsing, and drying cycle of an automatic car washer.

A further object of this invention is to provide a wheel washer which may be retracted out of the way when not in use on a car washing apparatus which reciprocates relative to a stationary automobile.

A still further object of the invention is to provide a wheel washer which may be extended under a fender or wheel skirt without damage thereto.

Other objects will appear in the disclosure which follows hereafter.

For the purpose of illustrating the invention, there is shown in the drawings a form which is presently preferred; it being understood, however, that this invention is not limited to the precise arrangements and instrumentalities shown.

Other objects and a fuller understanding of the invention may be had by referring to the following description of claims, taken in conjunction with the accompanying drawings in which:

FIGURE 3 is an enlarged view taken along line 3—3 of FIGURE 2.

FIGURE 4 is a front view of FIGURE 3.

FIGURE 5 is a sectional view taken along line 5—5 of FIGURE 3.

FIGURE 6 is a sectional detail taken along the line 6—6 of FIGURE 4.

Figure 1:
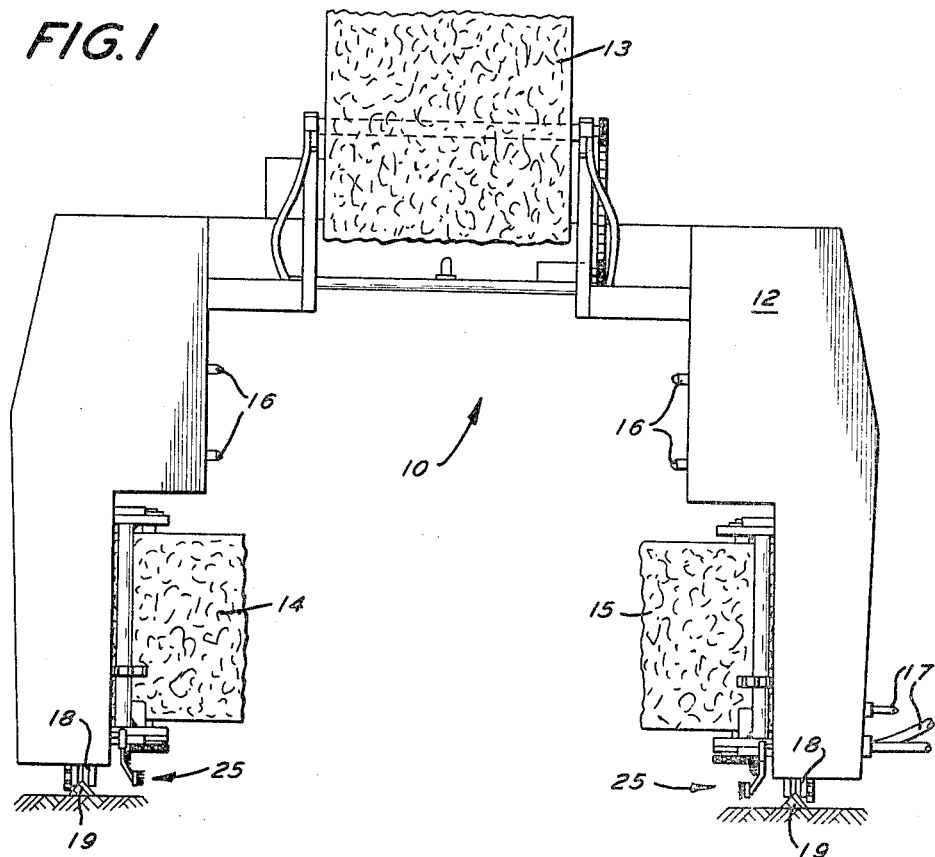
FIGURE 1 is an elevational front view of a car washing apparatus including a wheel washer thereon.

Referring to the drawings in detail, wherein like numerals indicate like elements, there is shown in FIGURE 1 a drawing of a car washing apparatus designated generally as 10. The apparatus 10 has an inverted U-shaped housing 12 carrying a top brush 13 and side brushes 14 and 15. The nozzles 16 are supplied through flexible cables 17 to spray a detergent, rinse water and wax on an automobile being washed by the apparatus 10. Apparatus 10 is mounted on wheels 18 for reciprocation along rails 19. The brushes 13, 14 and 15 rotate and are swung into an operational position as indicated by the arrows in FIGURE 2. The entire apparatus 10 reciprocates relative to a stationary automobile (not shown) for performing washing, rinsing and drying passes in an automatic, predetermined timed cycle. A more detailed description of the apparatus 10 and its operation may be found in the aforementioned copending application.

Figure 2:
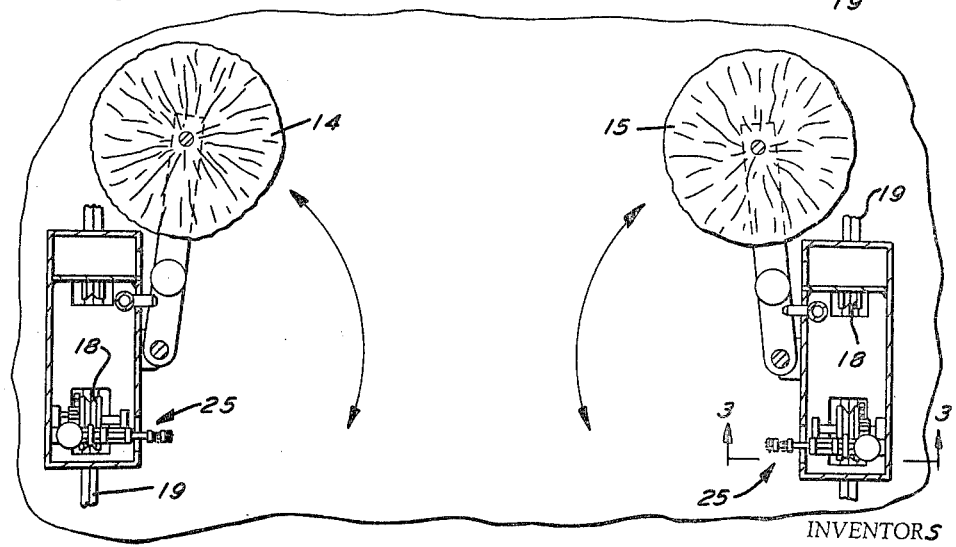
FIGURE 2 is a cross sectional plan view of FIGURE 1.

An automatic wheel washer, a component of the apparatus 10 is indicated generally by the numeral 25 and is shown on FIGURES 1 and 2 at a retracted position. Attention is directed to FIGURES 3 through 6 where the wheel washer 25 is shown in enlarged detail. The base member 30 is a channel having a flat bottom portion 32 mounted on a portion of the housing 12. Side walls 33 and 34 of base 30 support the rail members 35, 36. The groove 37, 38 is provided, respectively, on each rail member 35, 36, as shown, to provide a longitudinal guideway therealong. Rail members 35, 36 are affixed inside the side walls 33, 34 by means of machine screws 39.

The extension member 40 is an inverted channel identical to the base 30, however, somewhat longer. The channel of extension member 40 includes a top wall 42 and downwardly extending side walls 43, 44. The rollers 47, 48 are carried inside the side walls 43, 44 for a rolling engagement within the longitudinal grooves 37, 38 of rail members 35, 36.

The shaft 50 is journaled in bearing housings 53, 54 with a shaft end 51 extending outward from the extension member 40 as shown. The bearing housings 53, 54 are securely mounted on the top wall 42 of extension 40 by means of the bearing supports 56, 57 which are bolted to the extension member 40.

The arm member 60 has its upper extremity 61 pivoted in the bifurcated collar member 62 by means of a pivot pin 63. The bifurcated collar member 62 is affixed to the extending end 51 of shaft 50 by means of set screw 64. The arm 60 in the bifurcated collar member 62 is thereby rigidly affixed to turn with the shaft 50. Reference is now made to FIGURE 6 for more detail of the pivoted joint at bifurcated collar member 62. The upper extremity 61 includes a notch 65 which engages a top wall of the collar member 62 to prevent the arm member 60 from swinging upward toward the left. The arm 60 may swing a limited distance in the direction of the arrow, however, the leaf spring 67 biases the arm 60 in the opposite direction.

A brush 70 is connected at the opposite extremity of the arm member 60 as shown. The arm member 60 has a length corresponding to an average tire radius and the brush 70 is provided to wipe an outer side wall of a tire. An additional brush 72 may be positioned on the arm member 60 to wipe a wheel hub cap and rim.

An electric motor 75 is mounted at one end of the extension member 40 on the reduction box 77. The clutch and torque limiter 80 transmits motion from the motor and speed reduction box 77 to the shaft 50 in a manner well known in the art. The clutch completely disengages the shaft 50 for free rotation upon stoppage of the motor 75. It is also designed to slip whenever the torque reaches a predetermined limit.

A fluid ram is provided at 90 for the extension and retraction (indicated by the dotted lines in FIGURE 3) of the wheel washer 25. The fluid ram 90 includes the cylinder 91 and piston 93 in conventional engagement. The cylinder 91 is pivoted on the upright bracket 94, rigidly affixed to extend from the bottom wall 32 of the base member 34. The piston end of the ram 90 is pivoted on a similar upright bracket 95 which is rigidly affixed to the top wall 42, of the extension member 40. The source of fluid pressure may be introduced at either side of the piston 93 through the conduits 100, 101 to extend and contract the fluid ram 90 in a well known manner.

Normally, during movement of the automatic car washing apparatus 10 along the rails 19, the automatic wheel washer 25 will be at the retracted position shown in FIGURES 1 and 2. The wheel washers 25 will remain at the retracted position as long as the apparatus 10 is reciprocating past a stationary automobile. However, the operational cycle of the apparatus 10 will be programmed to make a stop opposite the front and back set of wheels of an automobile. At such time, fluid rams 90 will extend, carrying the extension member 40 and the arm 60 to the position shown in phantom on FIGURE 3. The extension is sufficient to allow the arm member 70 to be positioned within a wheel well with the brush 70 pressing against a side wall of a tire. At this time, the motor 75 is energized and rotational movement is transmitted from the gear reduction box 77 to the shaft 50 by means of the clutch-torque limiter 80. Shaft 80 will rotate turning the arm 60 with it, causing the brush 70 to wipe around the circumference of the tire. The additional brush 72 will wipe the rim and hub cap of a wheel therein. A leaf spring 67 provides steady pressure biasing the brushes 70, 72 against the wheel. In the event an obstruction is encountered by the arm member 60 in a wheel well, the torque limiter 80 will slip to prevent inflicting damage on the automobile. Upon completion of the wheel wiping cycle, the motor 75 will be deenergized and stopped. The clutch 80 will disengage allowing the shaft 50 to freely rotate with the arm 60 assuming its normal downward vertical position. With the vertical arm members 60 in a downward position, it may be rejected by the fluid ram 90 without causing any damage to the automobile. Since there is a wheel washer 25 at each side of the apparatus 10, simultaneous washing of a set of wheels may be accomplished. Therefore, the car washing apparatus 10 need be programmed to make only two stops, one for the front set of wheels and one for the back set of wheels during its washing cycle.

The present invention may be embodied in other specific forms without departing from the spirit or essential attributes thereof and, accordingly, reference should be made to the appended claims, rather than to the foregoing specification as indicating the scope of the invention.

We claim:

1. A washer for an automobile wheel, comprising: a base positionable opposite an automobile wheel; an extension member slidably mounted on said base for extension toward a wheel; an arm member having an end pivoted on said extension member; a brush carried by said arm member; means to rotate said arm member and brush; and means for extending said extension member to an operational position where said arm member may be rotated with said brush against a wheel for washing thereof.

2. A washer for an automobile wheel, comprising: a base positionable opposite an automobile wheel; an extension member slidably carried on said base for extension toward a wheel; a shaft journaled on said extension member with said shaft having an end extending outward from said extension member; an arm member having an extremity affixed on said end of said shaft to turn therewith, said arm member being gravity biased downwardly in a vertical plane; a brush on said arm member; means for rotating said shaft; and means for extending said extension member to an operational position where said shaft may be rotated with said brush wiping against a wheel for washing thereof.

3. A washer for an automobile wheel comprising: a base positionable opposite an automobile wheel; an extension member slidably carried on said base for extension toward a wheel; a shaft journaled on said extension member with said shaft paralleling a central axis through a wheel and having an end extending outward from said extension member; an arm member having an extremity affixed on said end to turn with said shaft, said arm member hanging at a downward position; a brush connected to said arm member; means for rotating said shaft, said means including a couple which disengages said shaft upon stoppage of said means to free said shaft therefrom and allow said arm member to swing to said downward position; and means for extending said extension member to an operational position where said shaft is rotated with said brush wiping against said wheel for washing thereof.

4. An automobile wheel washer in accordance with claim 2 wherein said couple is a torque limiter designed to slip at a predetermined torque.

5. A wheel washer in accordance with claim 3 wherein said means for extending is a fluid ram connected for extension and retraction between said base and extension member.

6. A washer for an automobile wheel, comprising: a base positionable opposite an automobile wheel; an extension member slidably carried on said base for extension towards a wheel; a shaft journaled on said extension member with said shaft being adapted to be parallel to a central axis through a wheel and having an end extending outward from said extension member; an arm member having an extremity affixed on said end to turn with said shaft, said arm member being gravity biased downwardly; a brush connected to said arm member; an electric motor mounted on said extension member; means coupling said shaft for rotation by said motor, said means disengaging upon stoppage of said motor to free said shaft therefrom allowing said arm member to swing downwardly due to gravity; and a fluid ram pivoted between said base and extension member, said ram extending said extension member toward a wheel to an operational position where said shaft is rotated whereby said brush may wipe against a wheel for washing thereof.

7. An automobile wheel washer in accordance with claim 6 wherein said brush is connected to an opposite, outermost extremity of said arm member.

8. A wheel washer in accordance with claim 6 wherein said coupling means is a clutch and torque limiter designed to slip at a predetermined torque and to disengage upon stoppage of rotation.

9. A wheel washer in accordance with claim 6 wherein said arm member is connected to said shaft end by a pivotable joint, and spring means biasing said arm member about said pivotable joint in a direction outwardly and away from said base.

10. In a reciprocating automatic car washing apparatus, a wheel washer therefor, comprising: a base member affixed on said apparatus for positioning therewith opposite an automobile wheel; said base including a rail member; an extension member over said base; rollers between said base and extension member for slidable extension of said member toward said wheel; a shaft journaled on said extension member with said shaft paralleling a central axis through said wheel and having an end extending outward from said extension member; an arm member having an extremity affixed on said end to turn with said shaft, said arm member hanging downward at a position in a vertical plane; a brush connected to said arm member; an electric motor mounted on said extension member; means coupling said shaft for rotation by said motor, said means disengaging upon stoppage of said motor to free said shaft therefrom allowing said arm member to swing to said downward position; and a fluid ram pivoted between said base and extension member, said ram extending said extension member toward said wheel to an operational position where said shaft is rotated with said brush wiping against said wheel for washing thereof.

11. A wheel washer in accordance with claim 10 wherein said brush is connected to an opposite, outermost extremity of said arm member and a hub cap and wheel rim brush is connected therebetween.

12. A wheel washer in accordance with claim 10 wherein said coupling means is a clutch and torque limiter designed to slip at a predetermined torque and to disengage upon stoppage of rotation.

13. A wheel washer in accordance with claim 10 wherein said arm member is connected to said shaft end by a pivotable joint, and spring means biasing said arm member about said pivotable joint in a direction outwardly and away from said base.

14. Apparatus comprising a pair of washers as set forth in claim 1, an inverted U-shaped housing, said housing being mounted for movement along rails, said wheel washers being supported on opposite sides of said housing adjacent the rails so that wheels on opposite sides of an automobile may be washed while the housing is disposed over the automobile.

15. Apparatus comprising a U-shaped inverted housing, said housing having legs mounted on rails for reciprocation along the rails, a wheel washer supported by each leg adjacent the rails for washing wheels on opposite sides of an automobile over which the housing extends, each wheel washer including an extension member, said members being slidably mounted for movement toward and away from each other, an arm member pivotably connected to an end of said extension member and extending in a direction generally perpendicular thereto, a brush carried by each arm member, motor means for rotating each arm member and its brush about the longitudinal axis of its extension member, and each arm member being gravity biased to an upright position.

References Cited by the Examiner
UNITED STATES PATENTS 2,815,127  12/1957  Edgecombe _____ 15—21 X
2,978,718  4/1961  Vani et al. _____ 15—21

CHARLES A. WILLMUTH, *Primary Examiner.*

E. L. ROBERTS, *Assistant Examiner.*